No. 622,662.

Patented Apr. 11, 1899.

E. M. BRAMMELL.

HORSE DETACHER.

(Application filed Aug. 27, 1898.)

(No Model.)

2 Sheets—Sheet 1.

Witnesses
J. C. Shaw
Chas. E. Brock

Inventor
Emma M. Brammell,
by O'Meara & Co
Attorneys

THE NORRIS PETERS CO., PHOTO-LITHO., WASHINGTON, D. C.

No. 622,662. Patented Apr. 11, 1899.
E. M. BRAMMELL.
HORSE DETACHER.
(Application filed Aug. 27, 1898.)
(No Model.) 2 Sheets—Sheet 2.
Fig. 6.
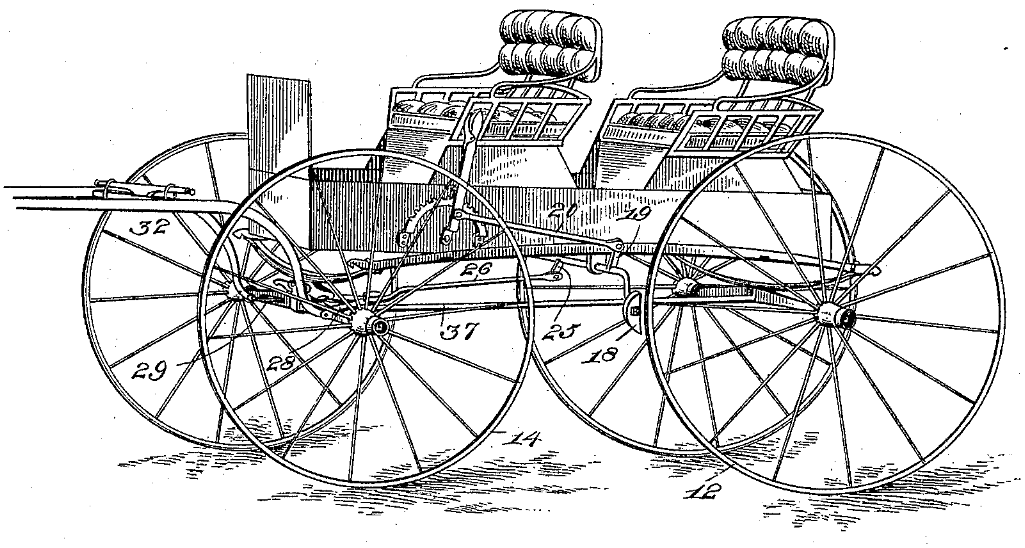
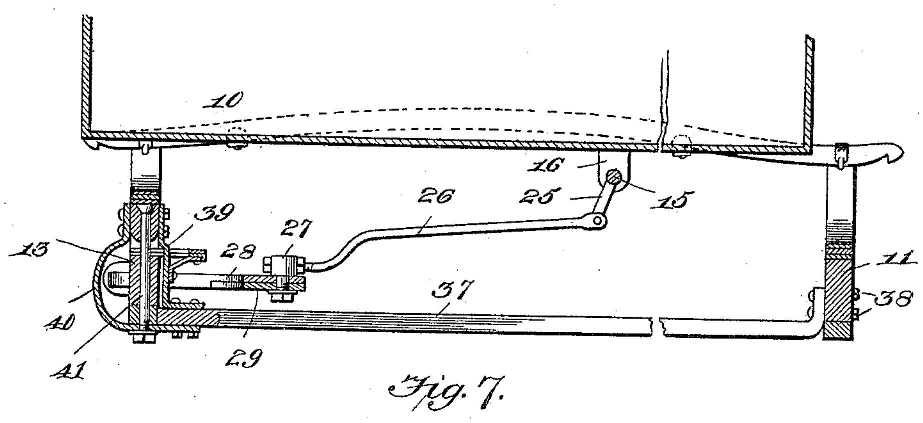
Fig. 7.
Witnesses
J. C. Shaw
Chas. E. Brock
Inventor
Emma M. Brammell,
by O'Meara & Co
Attorneys
THE NORRIS PETERS CO., PHOTO-LITHO., WASHINGTON, D. C.

UNITED STATES PATENT OFFICE.

EMMA M. BRAMMELL, OF NEW CANTON, ILLINOIS.

HORSE-DETACHER.

SPECIFICATION forming part of Letters Patent No. 622,662, dated April 11, 1899.

Application filed August 27, 1898. Serial No. 689,661. (No model.)

*To all whom it may concern:*

Be it known that I, EMMA M. BRAMMELL, a citizen of the United States, residing at New Canton, in the county of Pike and State of Illinois, have invented a new and useful Horse-Detacher, of which the following is a specification.

My invention relates to certain improvements in devices for attachment to wagons or other wheeled vehicles by means of which the horse or horses connected thereto may be instantly detached therefrom by the driver in case of accident or of the team becoming unmanageable, the device being so arranged that the brakes will be applied to the wagon-wheels simultaneously with or independently of the operation of the detaching devices, so that injury to the team or wagon or the occupants thereof may be prevented.

My invention consists in a pair of curved arms pivoted together at their rear ends and passed through slots in the front axle to engage, instead of the usual coupling-bolts, in the clips and thills or tongue-irons, a rod being connected to the pivotal pin of the two arms extending rearwardly under the wagon and connected at its rear end to an arm depending from the rocking brake-bar, the brake being of any ordinary construction and operated by the usual brake lever or handle.

My invention further consists in the improved construction, arrangement, and combination of parts hereinafter fully described and afterward particularly pointed out in the appended claims.

In order to enable others skilled in the art to which my invention most nearly appertains to make and use the same, I will now proceed to describe its construction and operation, having reference to the accompanying drawings, forming part hereof, in which—

Figure 1:
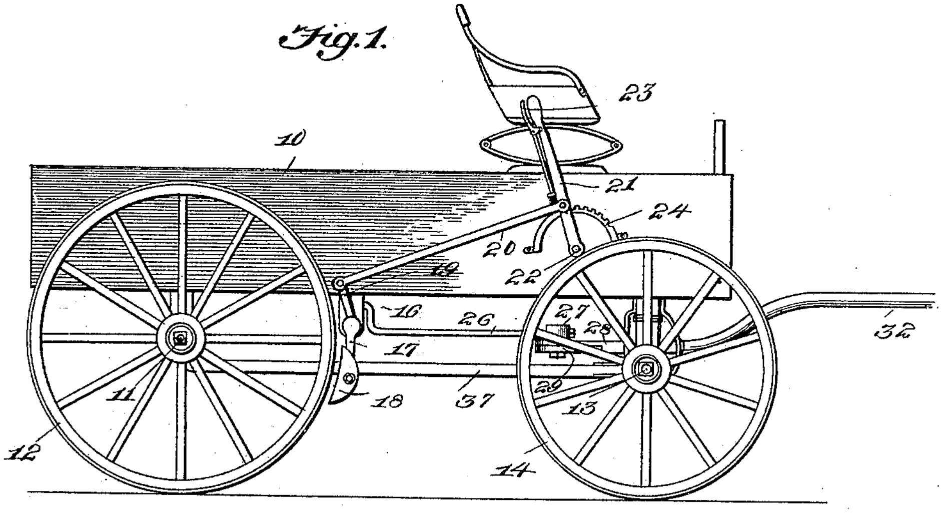
Figure 2:
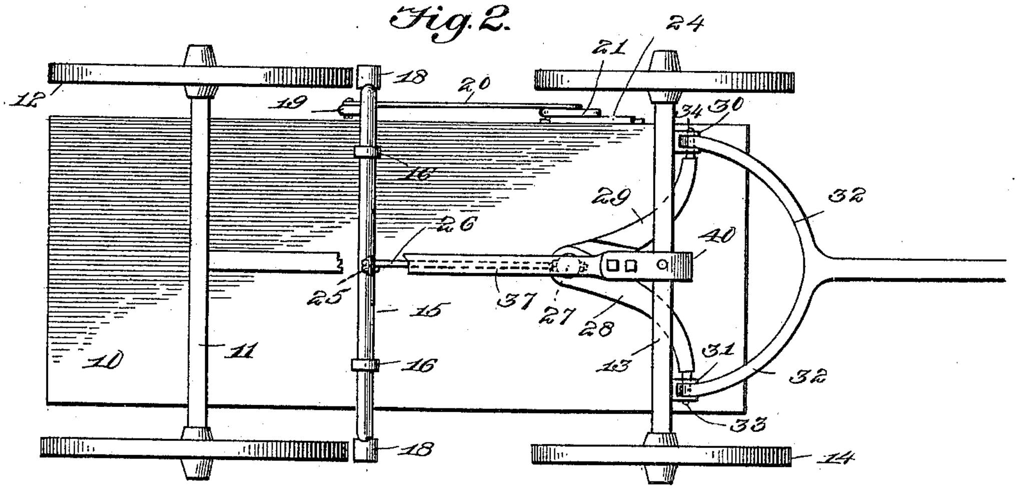
Figures 3, 4, 5:
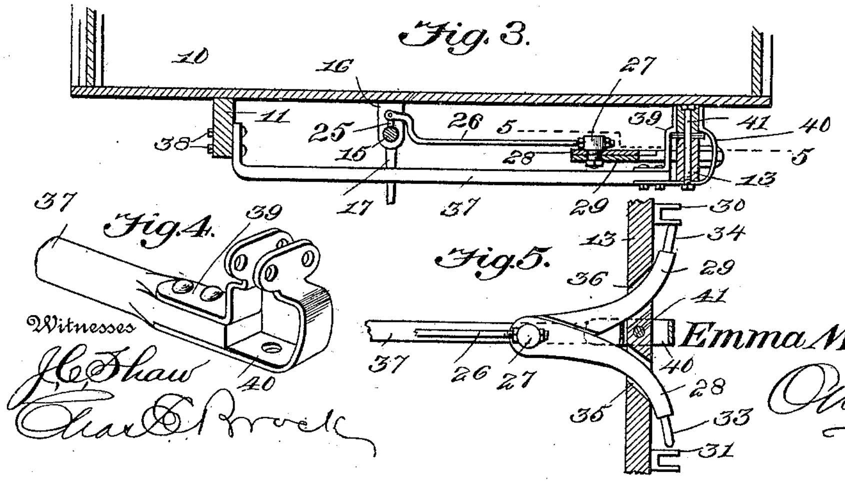

Figure 1 is a view in side elevation of a wagon equipped with my invention. Fig. 2 is a bottom plan view thereof, a portion of the coupling-pole being broken away. Fig. 3 is a partial sectional view taken on a vertical longitudinal plane through the wagon, several parts being omitted. Fig. 4 is a detail perspective view of the front end of the drop coupling-pole used in connection with my invention. Fig. 5 is a detail sectional view on the line 5 5 of Fig. 3. Fig. 6 is a perspective view illustrating my invention applied to a spring passenger-wagon, the mechanism being so arranged that the brake and detaching mechanism are operated simultaneously. Fig. 7 is a detail view thereof in longitudinal section, the wheels, part of the body, and the seats being omitted.

Like numerals of reference indicate the same parts wherever they occur throughout the various figures of the drawings.

Referring to the drawings by numerals, 10 indicates the body, 11 the rear axle, 12 the rear wheels, 13 the front axle, and 14 the front wheels, all of which may be of any ordinary or improved construction, the invention being capable of application to any and all varieties and styles of wagons or light wheeled vehicles.

15 indicates the brake rod or shaft, mounted transversely under the wagon-body in bearings 16. On each end of the shaft 15 is a downwardly-projecting arm 17, which carries a brake-shoe 18. Projecting upwardly from the shaft near one end is an arm 19, to which is pivotally connected a rod 20, which is pivotally connected at its forward end to a handle or lever 21, pivoted at 22 to the side of the wagon and provided with a pawl 23 to engage the teeth of a curved rack 24, secured to the side of the wagon-body.

Rising from the central portion of the shaft 15 is an arm 25, to which is pivotally connected a rod 26, said rod being connected at its forward end to a vertical bolt 27, which passes through the inner ends of two forwardly and outwardly curved arms 28 and 29.

30 and 31 indicate the clips by means of which the thills or tongue-irons 32 are connected to the axle. The arms 28 and 29 are formed at their outer front ends with pins 33 and 34, which when the arms are in their outer position act as bolts to secure the clips and tongue-irons together, taking the place of the ordinary bolts usually used for that purpose. The arms 28 and 29 are passed through and guided in their operation in slots 35 and 36 in the front axle. In order to provide room for the devices described, the coupling-pole 37 is dropped below the level of the rear axle, an upwardly-projecting arm at the rear end of the pole being secured to the rear axle by bolts 38. An angular plate 39 is bolted to the top of the forward end of the coupling-pole 37, and a plate 40 is bolted to the bottom thereof, the last-mentioned plate being bent to form a space between the first-mentioned plate, the end of the coupling-pole, and the last-mentioned plate to accommodate the front axle and bed-plate, the king-bolt 41 of the wagon passing through the axle, bed-plate, and plate 40.

In my invention hereinbefore described the detaching mechanism is connected to a dead-bed wagon and so arranged that the brakes may be applied and at the same time have no material effect upon the thill-pins. In fact such operation will push the pins farther into the couplings, as will be observed in Fig. 2, a space between the couplings and the shoulders of the coupling-pins serving to accommodate such movement.

In Figs. 6 and 7 I have illustrated my invention as applied to a spring passenger-wagon, with the mechanism so arranged that the brake is applied in the same manner as before by throwing the hand-lever forward, which movement at the same time releases the thill-irons by withdrawing the pins, allowing the horses to carry away the shafts, while the wagon, through the brake mechanism, is immediately stopped. The only alteration necessary in the mechanism is that the arm 25 depends downward instead of projecting upward from the brake-shaft 15. In other respects the construction of the device is identical, except that the teeth on the curved rack 24 are extended farther to the rear. I have not designated the various parts of the spring passenger-wagon which do not relate to my invention by letters, because they may be constructed of any suitable form and shape to suit the manufacturer or user.

The construction of my invention will be readily understood from the foregoing description, and to operate my improved detacher, as illustrated in Figs. 1 to 5, the driver will press the hand-lever rearward, which, through the medium of the rod 20 and arm 19, will rock the shaft 15, throwing the arms 17 forward and the arm 25 backward, which will cause the curved arms 28 and 29 to be moved backward through the slots 35 and 36 in the front axle, thereby withdrawing the points 33 and 34 from the axle-clips 30 and 31 and the tongue or thill irons 32, permitting the poles or thills to drop and be carried away by the horses. In this construction the brake will be operated in the usual manner.

To operate my improved detacher, as illustrated in Figs. 6 and 7, the driver will press the hand-lever 21 forward, which, through the medium of the rod 20 and arm 19, will rock the shaft 15, throwing the arms 17 backward and bringing the brake-shoes 18 into contact with the rear wheel. At the same time the arm 25 is carried backward, drawing the rod 26 with it, which causes the curved arms 28 and 29 to be moved backward through the slots 35 and 36 in the front axle, thereby withdrawing the points 33 and 34 from the axle-clips 30 and 31 and tongue or thill irons 32, permitting the pole or thills to drop and be carried away by the horses, leaving the wagon locked and immovable.

It will be obvious from the foregoing that by the operation of my invention all danger of injury to the wagon or the occupants thereof will be entirely obviated, the unmanageable team being entirely detached and left to pursue its own course, while the wagon may be brought to a standstill by the rigid application of the brakes, the brakes being held rigidly in contact with the rear wheels by means of a pawl 23, which when released by the driver will drop in between the teeth of the curved rack 24.

While I have illustrated and described the best means now known to me for carrying out my invention, I do not wish to be understood as restricting myself to the exact details of construction shown, but hold that any slight variation therefrom, such as might suggest itself to the ordinary mechanic, would properly fall within the limit and scope of my invention.

Having thus fully described my invention, what I claim as new, and desire to secure by Letters Patent of the United States, is—

1. The combination of the body of a wagon, the front axle slotted as described, the clips, two forwardly and outwardly curved arms passed through horizontal slots in the front axle having points to engage in the clips, a transverse rock-shaft journaled under the wagon-body, an operating-handle therefor, a central arm projecting from the shaft, and a rod connecting said arm with the pivotal point of the curved arm, substantially as described.

2. The combination of the body of a wagon, the front axle slotted as described, the clips, two forwardly and outwardly curved arms passed through horizontal slots in the front axle having points to engage in the clips, a transverse rock-shaft journaled under the wagon-body, an operating-handle therefor, a central arm depending from the shaft, and a rod connecting said arm with the pivotal point of the curved arm, substantially as described.

3. The combination of the body of the wagon, the axle, the wheels, the clips, the thill or tongue irons engaging in said clips, a pair of outwardly and forwardly curved arms passing through slots in the front axle pivoted together at their rear ends and provided with pins at their forward ends to engage in the clips and thills or tongue-irons, the transverse rock-shaft journaled under the body of the wagon, an arm projecting therefrom at the center, arms depending therefrom at each end, brake-shoes connected to the end arms, a rod connecting the central projecting arm with the pivotal joint of the two curved arms, an arm projecting upwardly from the rock-shaft near one end, a curved rack on the side of the wagon-body, a hand-lever pivoted to the wagon-body concentric with the curved rack, a pawl on the hand-lever to engage the teeth of the curved rack, and a rod connecting the hand-lever with the upper end of the rock-shaft, substantially as described.

EMMA M. BRAMMELL.

Witnesses:

W. I. WARE,

EDW. APPINGHOWAR.